(No Model.)

O. W. JONES.
DEVICE FOR PRESERVING EGGS.

No. 358,455. Patented Mar. 1, 1887.

Witnesses

Inventor,
Owen W. Jones:
By his Attorneys

UNITED STATES PATENT OFFICE.

OWEN W. JONES, OF NEW CAMBRIA, MISSOURI.

DEVICE FOR PRESERVING EGGS.

SPECIFICATION forming part of Letters Patent No. 358,455, dated March 1, 1887.

Application filed May 8, 1885. Serial No. 164,819. (No model.)

*To all whom it may concern:*

Be it known that I, OWEN W. JONES, a citizen of the United States, residing at New Cambria, in the county of Macon and State of Missouri, have invented a new and useful Improvement in Egg-Preservers, of which the following is a specification, reference being had to the accompanying drawings.

My invention consists in a novel construction and combination of parts essential in an egg-preserving tray, which will be more fully set forth hereinafter, and particularly pointed out in the claims.

Figure 1:
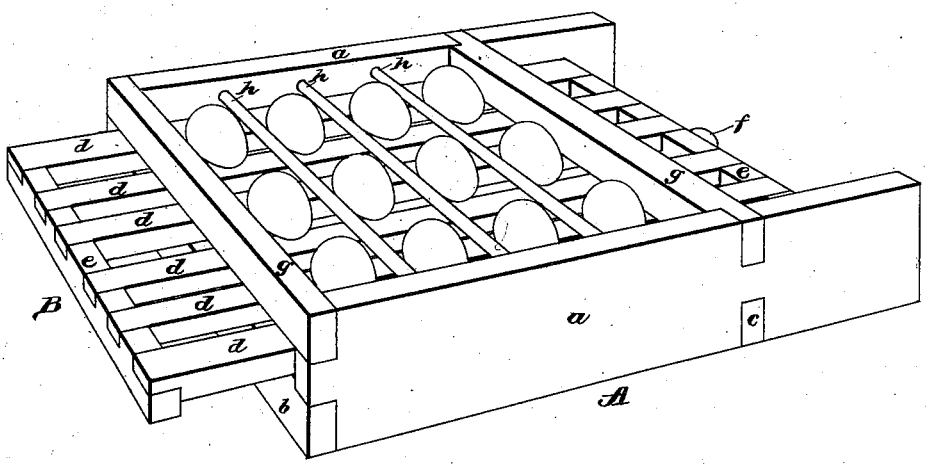
Figure 2:
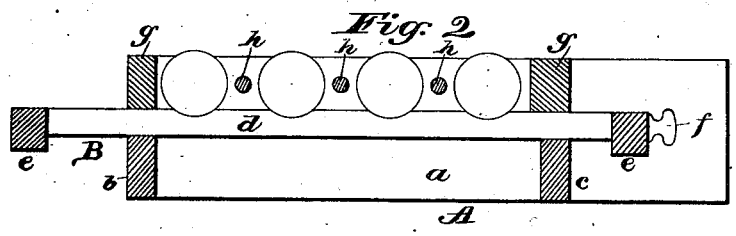
Figure 3:
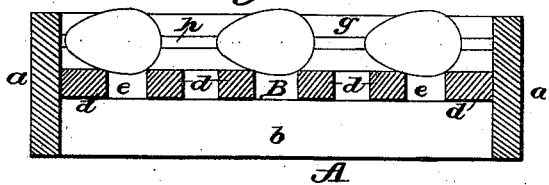
Figure 4:
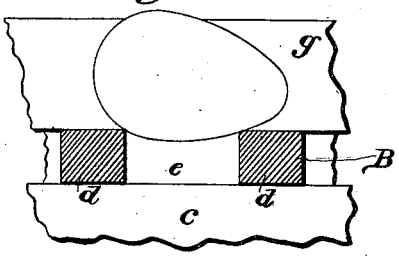

In the accompanying drawings, Figure 1 is a perspective view of an egg-preserver embodying my invention. Fig. 2 is a vertical longitudinal sectional view of the same, and Fig. 3 is a vertical transverse sectional view. Fig. 4 is a sectional view on an enlarged scale, showing more clearly the manner in which the eggs are supported on the slatted bottom.

It is well known that eggs kept in a dry cool place, as in a cellar, and turned or rolled daily, will keep fresh and sweet for a long time.

The object of my invention is to provide an inexpensive and reliable apparatus for conveniently rotating numerous eggs simultaneously.

My apparatus consists, in its simplest form, of the frame A, composed of the sides $a$ and the connecting or tie bars $b$ and $c$. These bars are much narrower than the sides, the bar $b$ forming a part of the rear end of the frame and the bar $c$ being connected to the sides near the front end thereof.

B represents the egg-supporting bottom of the apparatus. As devised by me, it is composed of two longitudinal bars or slats, $d$, and their connecting tie-bars $e$, which extend a little below the lower sides of the slats, as shown. This bottom is placed in the frame A, resting on the upper edges of the bars $b$ $c$, and is adapted to be moved back and forth in the frame, the limits of its reciprocating movement being defined by the bars $e$, which strike against the bars $b$ $c$. A knob, $f$, affords a handle for the slotted bottom B.

Transverse bars $g$, mortised into the upper edges of the sides of the frame, prevent the slatted bottom from being lifted vertically from the same.

Across the upper side of the frame, at a suitable height above the bottom B, are placed transverse wire rods or partitions $h$. These rods or partitions serve to freely control the eggs by keeping them within the proper limits and in crosswise rows while supported upon the slats of the bottom B, which slats are at right angles to the cross-bars $h$, as shown.

The apparatus is kept in a dry cool place, and the eggs to be preserved are placed on a slatted bottom, B, in rows between the rods or partitions $h$. By taking hold of the knob the bottom may be easily reciprocated in the frame, thereby rotating the eggs thereon, as will be readily understood.

An egg-preserving tray thus constructed may be made of any desired size, is exceedingly cheap and simple, and by its use eggs may be preserved fresh and wholesome for a long time.

It is to be distinctly understood that I do not claim to be the first inventor of an egg-tray or apparatus whereby eggs in storage may be turned or rolled; but prior devices for this purpose have either embodied in some form a series of parallel rollers, between each two of which the eggs are supported, or they have had a flat-surfaced bottom for supporting the eggs.

My apparatus is less expensive than any other known to me, and it is specially reliable in service, because each egg is supported on the slatted bottom at two points of contact, as shown in Figs. 3 and 4; and hence it is practically impossible for any of the eggs to spoil, because of their failure to turn, as is liable when rollers warp or twist and fail to work properly, and, also, when there is but one point of contact between the supporting-surface and each egg, as when a flat-surfaced support is employed, and the slats afford a free circulation of air not possible with a flat-surfaced bottom.

The two points of contact above referred to are clearly seen in Fig. 4, the egg resting in the space between two of the slats, the opposite corners of which form the two points of contact, as stated. The bottom, when slid along in the frame, will carry the eggs with it, causing the eggs to strike the partitions, which will roll or turn the eggs, the latter rolling on the bottom in the space between each two of the slats, so as to be guided along and enable the proper turn to be given.

Having thus described my invention, I claim—

1. In an egg-preserving tray, the combination, substantially as hereinbefore described, of a frame provided with egg-controlling crossbars or partitions, and a bottom composed of slats at right angles to and below said bars, for supporting eggs at spaces between said slats and thus providing the two points of contact for each egg, said frame and slatted bottom being movable with reference to each other for causing all of the eggs in the tray to be simultaneously turned, as set forth.

2. In an egg-preserving tray, the combination, substantially as hereinbefore described, of a frame provided with egg-controlling bars or partitions, and a bottom having slats for supporting eggs at spaces between said slats and affording the two points of contact for each egg, said frame and slatted bottom being movable with reference to each other for causing all of the eggs in the tray to be simultaneously turned, as set forth.

3. The frame A, comprising the sides $a$, the tie-bars $b$ $c$, connecting the sides at the bottom, and the transverse bars $g$, connecting the sides across the top on a line with the bars $b$ $c$, in combination with the slatted bottom B, working within the frame A between the bars $b$ $c$ $g$, the end bars, $e$, of the bottom serving to limit the movement thereof, as set forth.

4. An apparatus for preserving eggs, consisting of the stationary frame A, the slatted bottom B, working back and forth in the frame and adapted to support the eggs, and the rods or partitions $h$, secured to the frame and extending above and across the upper side of the bottom, so as to separate the eggs into rows, whereby as the bottom is reciprocated the eggs resting thereon will be caused to strike the wires or partitions $h$, and thus effect the partial turning of the eggs, as set forth.

5. In an egg-tray, the combination, substantially as hereinbefore described, of a bottomless partitioned frame, and a bottom provided with egg-supporting slats or bars at right angles to the partitions in said frame, said bottom and frame being movable with reference to each other for causing each egg in the tray to be turned over while supported on the slats or bars of the bottom, as set forth.

In testimony that I claim the foregoing as my own I have hereto affixed my signature in presence of two witnesses.

OWEN W. JONES.

Witnesses.
C. M. COLE,
J. L. THOMAS.